US012258066B1

(12) United States Patent
Zalanka et al.

(10) Patent No.: US 12,258,066 B1
(45) Date of Patent: Mar. 25, 2025

(54) SPACE FRAME KINETIC FRONT SUSPENSION FABRICATION

(71) Applicant: Caterpillar Inc., Peoria, IL (US)

(72) Inventors: David O. Zalanka, Mt Zion, IL (US); Jacob W. Bell, Decatur, IL (US); Timothy D. Harman, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 16 days.

(21) Appl. No.: 18/367,476

(22) Filed: Sep. 13, 2023

(51) Int. Cl.
*B62D 21/11* (2006.01)
*B62D 21/02* (2006.01)
*B62D 27/02* (2006.01)

(52) U.S. Cl.
CPC .............. *B62D 21/11* (2013.01); *B62D 21/02* (2013.01); *B62D 27/023* (2013.01)

(58) Field of Classification Search
CPC ....... B62D 21/11; B62D 21/02; B62D 27/023
USPC .......................................................... 280/798
See application file for complete search history.

(56) References Cited

U.S. PATENT DOCUMENTS

| | | | |
|---|---|---|---|
| 9,731,773 B2* | 8/2017 | Gami | B62D 27/02 |
| 9,981,519 B2 | 5/2018 | Despres-Nadeau et al. | |
| 10,183,706 B2* | 1/2019 | Miller | E04B 1/1909 |
| 10,479,408 B2 | 11/2019 | Upah et al. | |
| 10,703,427 B2 | 7/2020 | Stevens | |
| 11,186,315 B2* | 11/2021 | Miller | B62D 21/09 |
| 11,420,493 B2 | 8/2022 | Miller | |
| 11,884,329 B2* | 1/2024 | Zalanka | B62D 27/023 |
| 12,122,457 B1* | 10/2024 | Zalanka | B62D 21/11 |
| 2013/0175828 A1* | 7/2013 | White | B62D 27/023 296/203.03 |
| 2016/0264189 A1* | 9/2016 | Gami | B23K 31/02 |
| 2017/0066480 A1 | 3/2017 | Uranaka et al. | |
| 2019/0217894 A1 | 7/2019 | Upah et al. | |
| 2021/0122211 A1 | 4/2021 | Miller | |
| 2021/0122420 A1 | 4/2021 | Miller et al. | |

FOREIGN PATENT DOCUMENTS

| | | |
|---|---|---|
| CN | 214823614 U | 11/2021 |
| EP | 2711267 B1 | 7/2015 |
| FR | 3051213 B1 | 5/2018 |
| KR | 20050117582 A | 12/2005 |
| KR | 20220053285 A | 4/2022 |

OTHER PUBLICATIONS

Written Opinion and International Search Report for Int'l. Patent Appln. No. PCT/US2024/042011, mailed Nov. 11, 2024 (11 pgs).

* cited by examiner

*Primary Examiner* — Paul N Dickson
*Assistant Examiner* — Caitlin Anne Miller

(57) ABSTRACT

A front suspension transition, which can be a fabrication, can comprise: a body having a first end and a second end opposite the first end; a first pair of ribs on a first side of the body; a second pair of ribs on a second side of the body opposite the first side of the body; and a connection interface on the second end of the body, the connection interface being arcuate. The body can include at least a first curved opening and a second curved opening spaced from the first curved opening in a length direction of the body.

20 Claims, 5 Drawing Sheets

SPACE FRAME KINETIC FRONT SUSPENSION FABRICATION

TECHNICAL FIELD

The present disclosure relates to space frames, and more particularly to a front suspension transition, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

FR 3051213 ("the FR '213 patent document") describes a mounting support intended to position a lock on a structural element. According to the FR '213 patent document, the mounting support comprises a support face intended to receive the lock and a gripping face, a reversible holding means intended to hold the lock, at least one positioning means intended to position the support relative to the structural element on which the lock is intended to be fixed, and a gripping means located on the gripping face and shaped to be taken with one hand.

SUMMARY

In one aspect a front suspension transition, which can be a fabrication, can be provided or implemented. The front suspension transition can comprise: a body having a first end and a second end opposite the first end, a first pair of ribs on a first side of the body; a second pair of ribs on a second side of the body opposite the first side of the body; and a connection interface on the second end of the body, the connection interface being arcuate, wherein the body, the ribs of the first pair of ribs, the ribs of the second pair of ribs, and the connection interface are in the form of plates, wherein the body includes at least a first curved opening and a second curved opening spaced from the first curved opening in a length direction of the body, and wherein the front suspension fabricated transition is asymmetrical in a bottom plan view of the front suspension fabricated transition and in a top plan view of the front suspension fabricated transition.

In another aspect a space frame, for instance, for an off-highway rear haul truck, can be provided or implemented. The space frame can comprise: a front lower suspension connection; a front suspension transition fabrication; and a pair of elongate support members, wherein the front suspension transition fabrication is welded to the front lower suspension connection at a first end of the front suspension transition fabrication and is welded to each of the elongate support members at a second end of the front suspension transition fabrication opposite the first end such that the elongate support members are spaced from the front lower suspension connection, wherein the front suspension transition fabrication includes: a body, a first pair of ribs welded on a first side of the body, a second pair of ribs welded on a second side of the body opposite the first side of the body, and a connection interface forming the second end of the front suspension transition fabrication and being welded to each of the elongate support members, the connection interface being arcuate, wherein each of the ribs of the first pair of ribs and the ribs of the second pair of ribs extends from the front lower suspension connection to the connection interface.

In yet another aspect a method can be implemented. The method can comprise: providing a front suspension transition; and providing one of a front lower suspension or at least one of a first tubular support member or a second tubular support member, each of the first and second tubular supports being cylindrical, wherein the front suspension transition includes: a body having a first end and a second end opposite the first end; a first pair of ribs on a first side of the body; a second pair of ribs on a second side of the body opposite the first side of the body; and a connection interface on the second end of the body, the connection interface being curved, wherein the body includes a first curved opening and a second curved opening spaced from the first curved opening in a length direction of the body, and wherein the front suspension fabricated transition is asymmetrical in a bottom plan view of the front suspension fabricated transition and/or in a top plan view of the front suspension fabricated transition.

DETAILED DESCRIPTION

Embodiments of the present disclosure can involve or be directed to a front suspension transition, and systems, components, and methods thereof.

Figure 1:
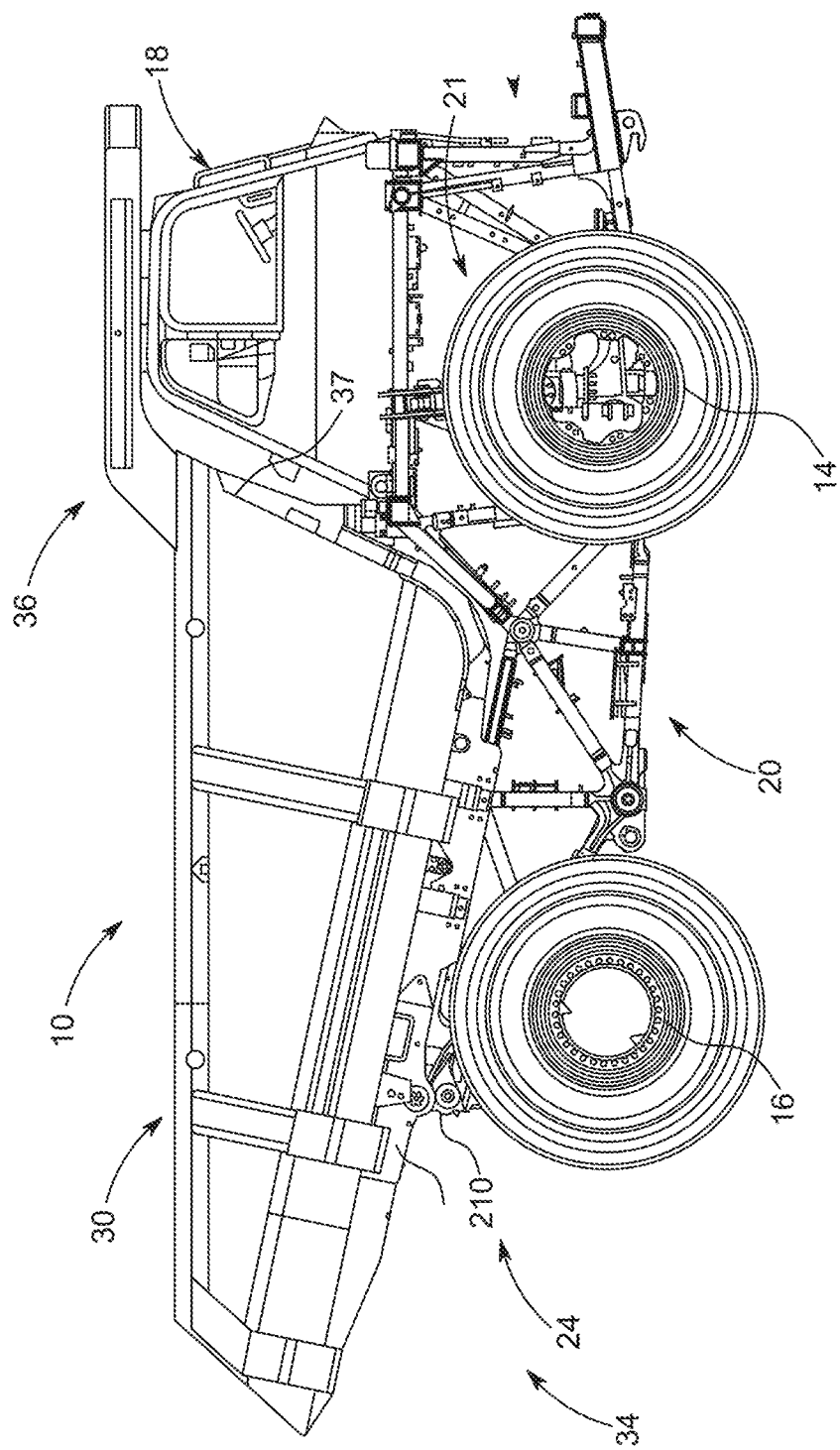
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck.

Machine 10 may have a space frame 20 supported by front wheels 14 and rear wheels 16 (including respective tires). The front and rear wheels 14, 16 may be connected to space frame 20 by front suspension members and rear suspension systems, respectively.

Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train to transfer motive power to move the front and/or rear wheels 14, 16 in a forward or rearward direction.

Exhaust from the prime mover may be output from one or more exhaust outputs. Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structure. The structural members can be made of metal, metal alloys, or reinforced composite materials, for instance.

Figure 2:
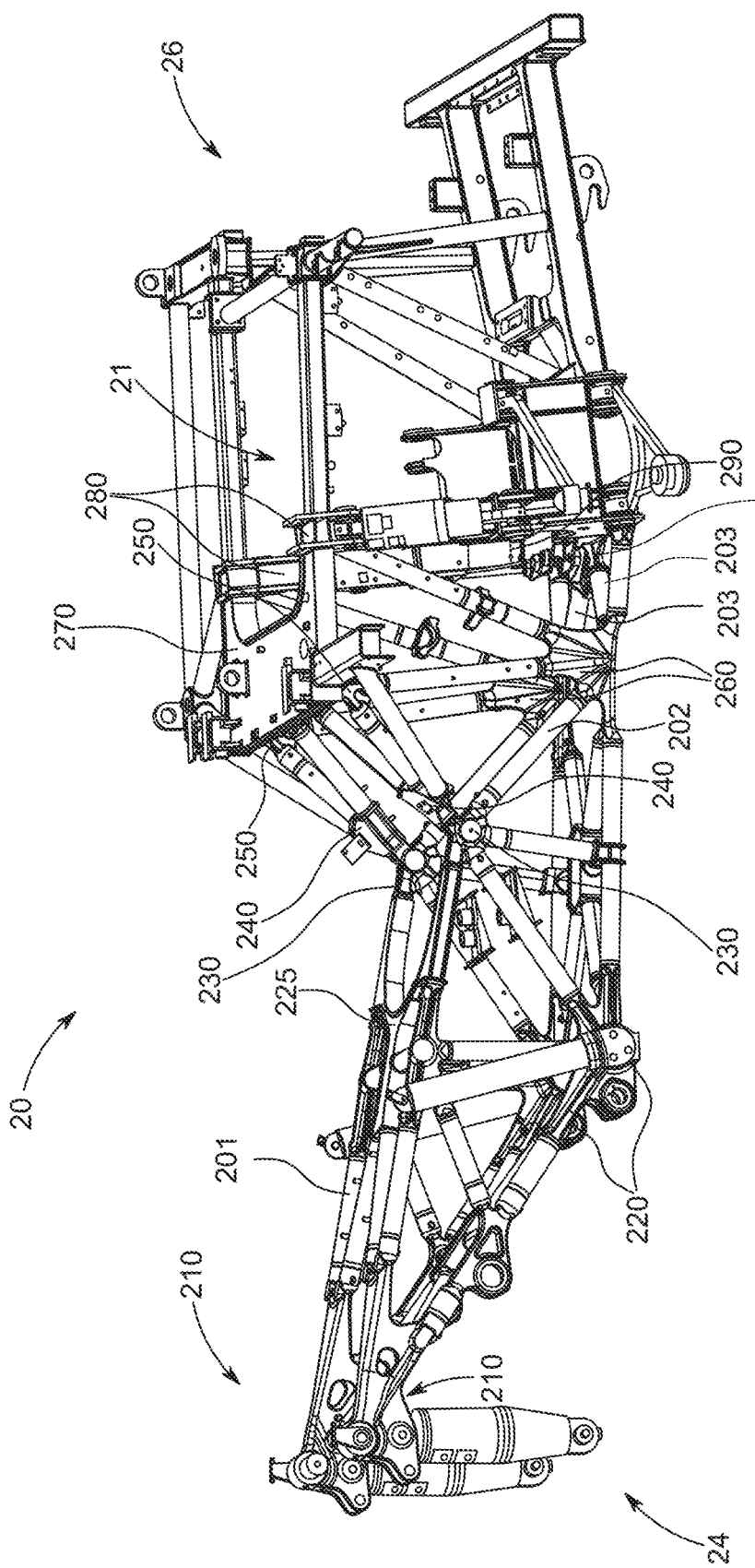
FIG. 2 is a side view of a space frame according to embodiments of the disclosed subject matter.

FIG. 2 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front suspension transition 265, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The space frame 20 can also include a plurality of elongate support members, such as elongate support members 201, elongate support members 202, and elongate support members 203. Elongate support members, according to embodiments of the disclosed subject matter, can be in the form of rods and/or tubes, circular, for instance, where some or all of the rods and/or tubes may be solid or hollow.

Figure 3:
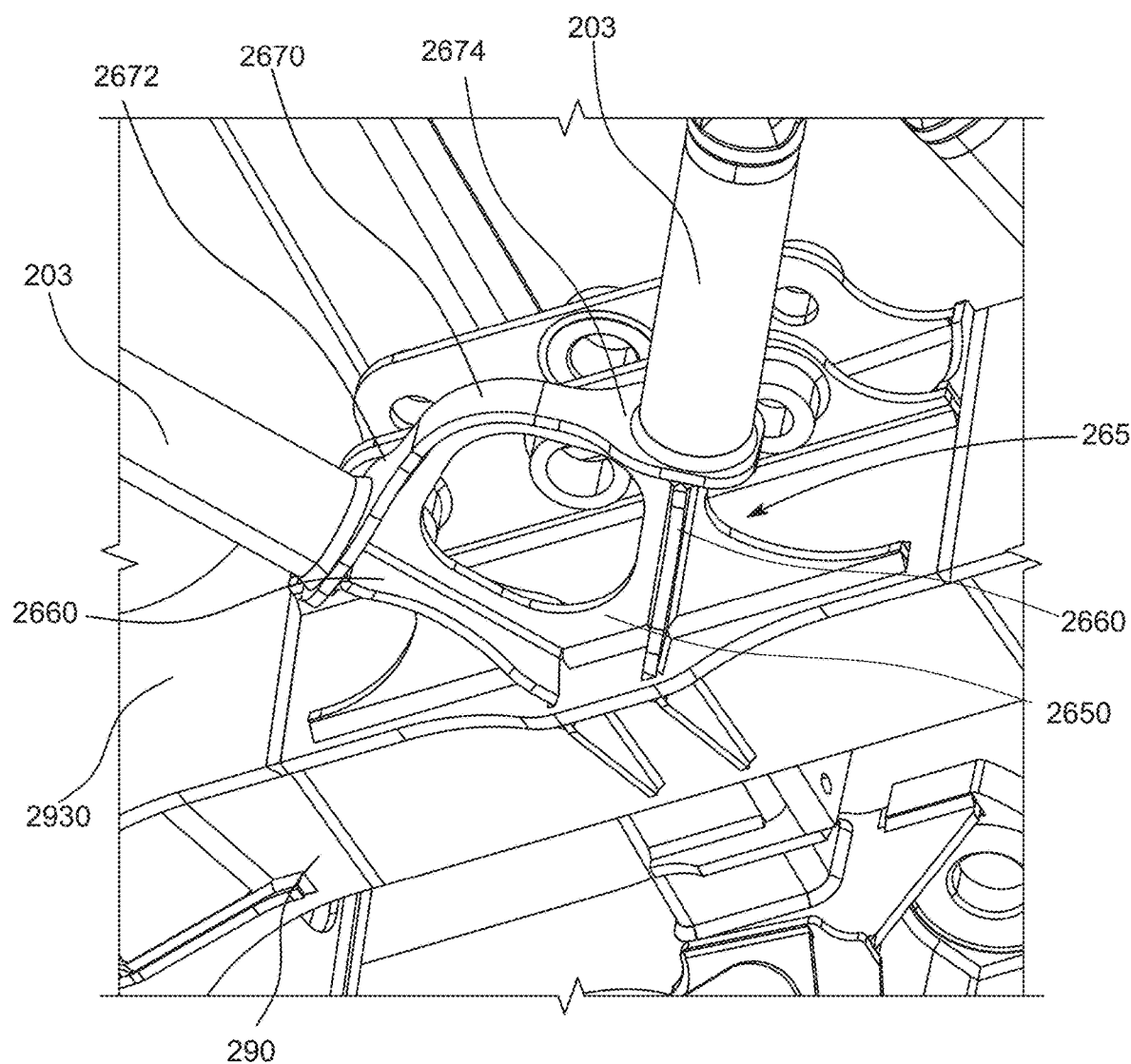
FIG. 3 shows a front suspension transition according to one or more embodiments of the present disclosure, implemented in the space frame of FIG. 2.
Figure 4:
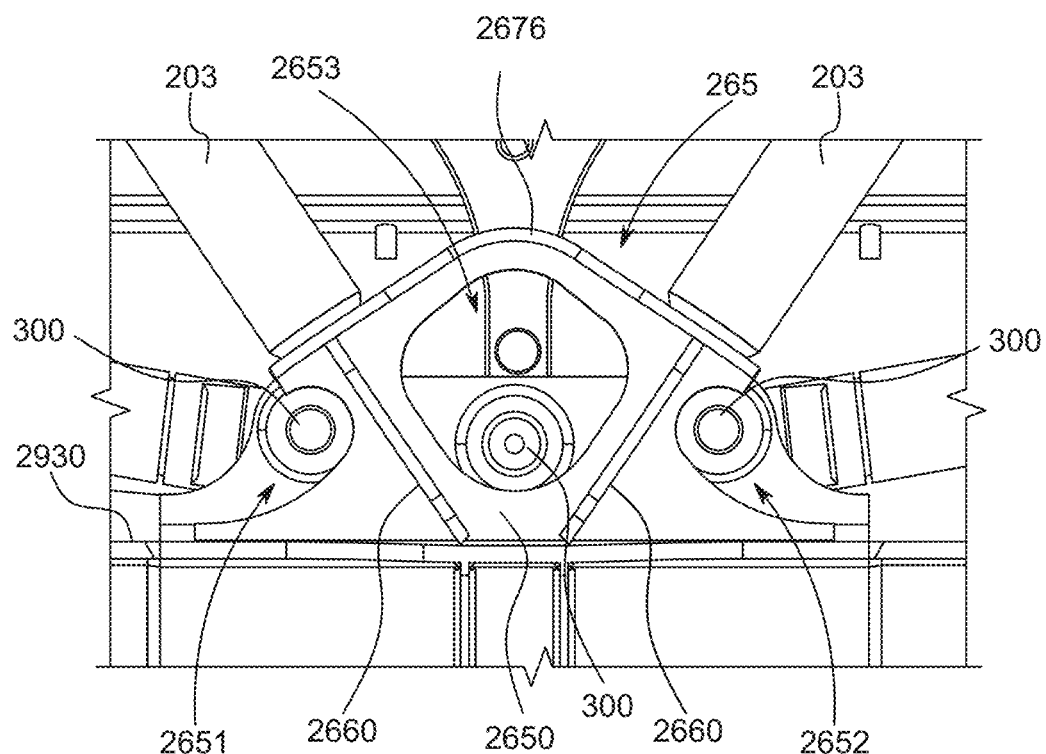
FIG. 4 is a side view of the front suspension transition of FIG. 3.

Turning now to FIG. 3 and FIG. 4, the front suspension transition 265 can be a fabrication and can be connected between a front lower suspension connection 290, particularly a rear mounting surface 2930 thereof, and a pair of elongate support members 203. Thus, the front suspension transition 265 can be regarded as a front suspension transition fabrication or a front suspension fabricated transition. Further, the front suspension transition 265 can have a first end fixed (e.g., welded) to the rear mounting surface 2930 and a second end opposite the first side fixed (e.g., welded) to each of the elongate support members 203. The elongate support members 203 can be spaced or separated from the front lower suspension connection 290 by way of the front suspension transition 265.

Figure 5:
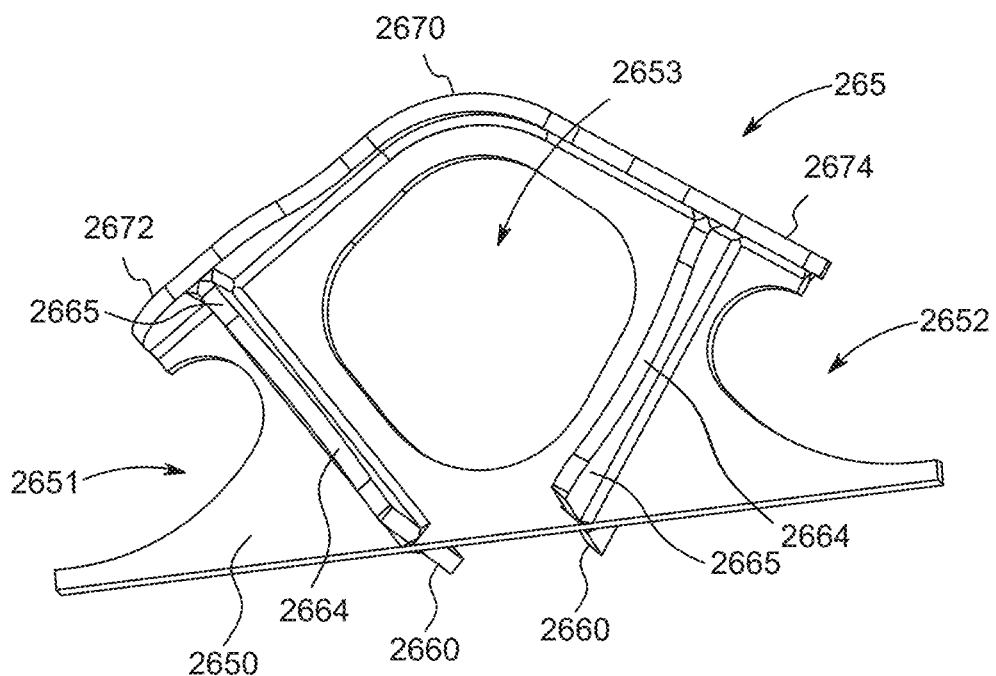
FIG. 5 is another view of the front suspension transition of FIG. 3.
Figure 6:
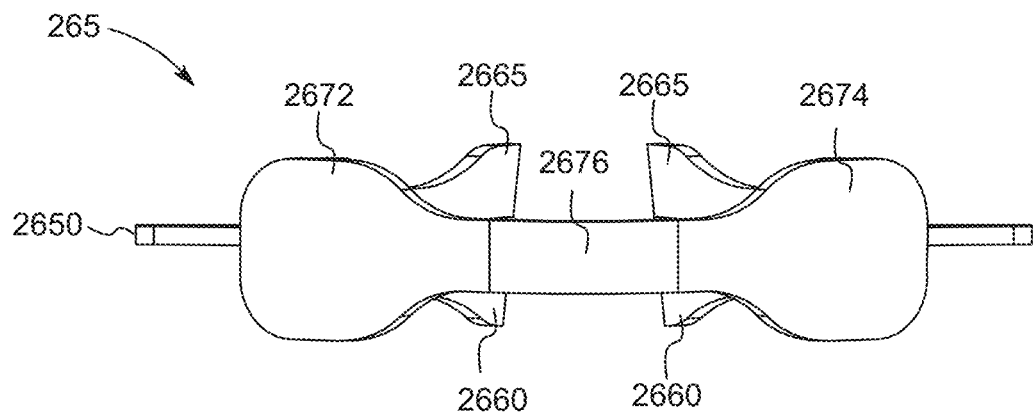
FIG. 6 is a top view of the front suspension transition of FIG. 3.
Figure 7:
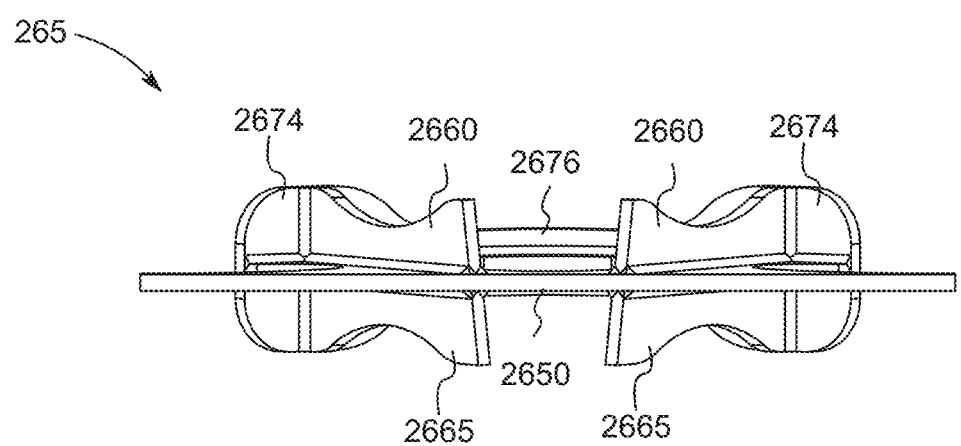
FIG. 7 is a bottom view of the front suspension transition of FIG. 3.

Referring now also to FIGS. 5-7, the front suspension transition 265 can have a body 2650 having a first end and a second end opposite the first end, a first pair of ribs 2660 on a first side of the body 2650, a second pair of ribs 2665 on a second side of the body 2650 opposite the first side, and a connection interface 2670 on the second end of the body 2650. According to one or more embodiments, the front suspension transition 265 can be asymmetrical in an end view, a top plan view, and/or a bottom plan view. The front suspension transition 265 can be symmetrical in a side elevational view, such as shown in FIG. 4. Each of the body 2650, the ribs 2660 of the first pair of ribs, the ribs 2665 of the second pair of ribs, and/or the connection interface 2670 can be formed in one piece, for instance, from metal.

Optionally, the front suspension transition 265, including the front suspension transition 265 in non-assembled form, can consist of the body 2650, the first pair or ribs 2660, the second set of ribs 2665, and the connection interface 2670. Further, optionally, the front suspension transition 265 can include a weld joint or joints associated with welding of the connection interface 2670 to the body 2650 and/or a weld joint or joints associated with each of the ribs from the first pair of ribs 2660 and the second pair of ribs 2665. The connection interface 2670 can form the second end of the front suspension transition 265. According to one or more embodiments, the body 2650, the ribs 2660 of the first pair of ribs, the ribs 2665 of the second pair of ribs, and/or the connection interface 2670 can be in the form of plates. All of the plates can be flat except for a portion of the connection interface 2670 (discussed in more detail below). Optionally, some or all faces of the plates can be smooth.

Each of the elongate support members 203 can extend from the front suspension transition 265, particularly the connection interface 2670, at a right angle with respect to corresponding connection portions of the connection interface, such as shown in FIG. 3 and FIG. 4. Also shown in FIG. 3 and FIG. 4, the ribs 2660 (of the first pair of ribs) can be aligned with respective ones of the elongate support members 203 of the pair of elongate support members. Likewise, the ribs 2665 (of the second pair of ribs), which can be on the other side of the body 2650, can be aligned with respective ones of the elongate support members 203 of the pair of elongate support members. Thus, first opposing ribs of the first 2660 and second 2665 pairs of ribs, on the first and second sides of the body 2650, respectively, can be aligned with a first elongate support member 203 of the pair of elongate support members, for instance, in a side view of the front suspension transition 265, and second opposing ribs of the first 2660 and second 2665 pairs of ribs, on the first and second sides of the body 2650, respectively, can be aligned with a second elongate support member 203 of the pair of elongate support members, for instance, in the side view of the front suspension transition 265. Further, the ribs 2660, 2665 can extend from the corresponding side of the body 2650 at a right angle. The ribs 2660, 2665 can also extend from the connection interface 2670 at a right angle.

As shown in FIG. 4 and FIG. 5, for instance, the first pair of ribs 2660 can be entirely separated from each other, and, likewise, the second pair of ribs 2665 can be entirely separated from each other. Further, each of the ribs 2660, 2665 can extend from the rear mounting surface 2930 of the front lower suspension connection 290 toward and to the connection interface 2670. Thus, the ribs 2660, 2665 can extend from the first end of the body 2650 to the second end of the body 2650. Such extension can be at an angle, for instance, acute, right, or obtuse (e.g., 90 degrees+/−10 degrees) for the first pair of ribs 2660 and the second pair of ribs 2665. Optionally, the angle can be the same for the first pair of ribs 2660 and the second pair of ribs 2665 on the first side of the body 2650 and the second side of the body 2650, respectively.

The ribs 2660 can be identical to each other. Likewise, the ribs 2665 can be identical to each other. According to one or more embodiments, all of the ribs 2660, 2665 can be identical to each other. Each of the ribs 2660 and each of the ribs 2665 can have a concave portion 2664, which may be situated at a middle portion in a length direction of the ribs 2660, 2665.

The body 2650 of the front suspension transition can include a plurality of cutouts, including a first cutout 2651, a second cutout 2652, and a third cutout 2653. As shown in FIG. 5, for instance, the third cutout 2653 can be between the first cutout 2651 and the second cutout 2652 in a length direction of the body 2650. The first cutout 2651 and the second cutout 2652 can be identical. As shown in FIG. 5, for example, the first cutout 2651, the second cutout 2652, and the third cutout 2653 can be curved. Further, according to one or more embodiments, the first cutout 2651, the second cutout 2652, and the third cutout 2653 each can be spaced from the first end of the body 2650 and/or the second end of the body 2650. The third cutout 2653 can be enclosed by the body 2650, whereas each of the first cutout 2651 and the second cutout 2652 may not be fully enclosed by the body 2650.

The connection interface 2670, generally speaking, can have an elongate body, bent, at an angle, convex outward relative to the first end of the body 2650 (and the rear mounting surface 2930 when the first end of the body 2650 is welded to the rear mounting surface 2930). The connection interface 2670 can have a first connection portion 2672 at a first end and a second connection portion 2674 at a second end opposite the first end. The first connection portion 2672 and the second connection portion 2674 each can be regarded as connection pads. In this regard, the first connection portion 2672 and the second connection portion 2674 each can receive corresponding ones of the elongate support members 203 for fixed attachment (e.g., via welding) of the elongate support members 203 to the respective first connection portion 2672 or the second connection portion 2674.

The connection interface 2670 can also include a middle portion 2676, which can be curved at an angle. The connection interface 2670 can be straight from the first connection portion 2672 to the middle portion 2676 and from the second connection portion 2674 to the middle portion 2676. Optionally, the connection interface 2670 can taper in width from thick to thin from the first connection portion 2672 toward the middle portion 2676 and from the second connection portion 2674 toward the middle portion 2676.

INDUSTRIAL APPLICABILITY

As noted above, embodiments of the present disclosure can involve or be directed to a front suspension transition, and systems, components, and methods thereof. The front suspension transition, as noted above, can be a fabrication.

Tubular structures can provide lightweight structures, however, some connections truncate where coped tubes have to be welded by hand to a flat surface. These connections may be complicated and difficult to weld. For instance, tubes under a steering box in a haul truck attaching to the front suspension mounting assembly may intersect and may require to be coped together with complicated cuts. The welding for the interface may also be complicated and may only be able to be done manually. In addition, the tubes may block (e.g., partially or fully) access to the steering cylinder pins and may make access for removing them difficult or impossible.

According to one or more embodiments of the present disclosure, a fabricated transition can be provided or implemented such that the tube joints are moved away from each other and away and from surrounding components, for instance, so the ends of them can be squared up (i.e., at right angles). The squared up ends of the tubes with the additional clearance to other parts of the frame can enable a mechanized orbital welding machine for welding the tubes to the fabricated transition can be used. The unique shape of the fabricated transition can also allow full access to the steering cylinder pins.

According to one or more embodiments of the present disclosure, a space frame, such as space frame 20, or portion thereof, such as a front suspension transition, e.g., front suspension transition 265, can be provided or implemented (including assembled fully or partially). As noted above, the front suspension transition 265 can have the body 2650, the first pair of ribs 2660, the second pair of ribs 2665, and the connection interface 2670.

The body 2650 can have a first cutout, such as first cutout 2651, a second cutout, such as second cutout 2652, and a third cutout, such as third cutout 2653. The first cutout 2651, the second cutout 2652, and the third cutout 2653 can be sized and shaped to allow access to respective steering pins 300, such as shown in the bottom view of the space frame 20 of FIG. 4.

The front suspension transition 265 can be fixed to (e.g., welded to) a pair of elongate support members, such as elongate support members 203 shown in FIG. 4. The front suspension transition 265 can also be fixed to (e.g., welded to) a rear mounting surface of a front lower suspension connection, such as rear mounting surface 2930 of the front lower suspension connection 290. More specifically, the elongate support members 203 can be welded directly to the connection interface 2670, and the base 2650 and optionally the ribs 2660, 2665 can be welded directly to the rear mounting surface 2930 of the front lower suspension connection 290.

According to one or more embodiments, the front suspension transition 265 can be asymmetrical in an end elevational view, a top plan view, and/or a bottom plan view. In this regard, the front suspension transition 265 can extend from the rear mounting surface 2930 of front lower suspension connection 290 at an acute angle with respect to the rear mounting surface 2930 in a side elevational view of the space frame 20, which can also be upward relative to horizontal. Thus, the ribs 2660, 2665 and the base 2650, themselves, can be angled or canted at the acute angle with respect to the rear mounting surface 2930 in the side elevational view of the space frame 20, which can also be upward relative to horizontal. The front suspension transition 265 can be symmetrical in a side elevational view.

There can be one or more reasons the ribs 2660, 2665 are configured as they are, including to match the stiffness of the elongate support members 203, for instance, for fatigue life; to reduce weight; and/or align the middle plate along the intersecting tube axis, which can make an efficient load path connection to the front lower suspension connection 290.

Embodiments of the disclosed subject matter can also be as set forth according to the following parentheticals.

(1) A space frame for an off-highway rear haul truck comprising: a front lower suspension connection; a front suspension transition fabrication; and a pair of elongate support members, wherein the front suspension transition fabrication is welded to the front lower suspension connection at a first end of the front suspension transition fabrication and is welded to each of the elongate support members at a second end of the front suspension transition fabrication opposite the first end such that the elongate support members are spaced from the front lower suspension connection, wherein the front suspension transition fabrication includes: a body, a first pair of ribs welded on a first side of the body, a second pair of ribs welded on a second side of the body opposite the first side of the body, and a connection interface forming the second end of the front suspension transition fabrication and being welded to each of the elongate support members, the connection interface being arcuate, wherein each of the ribs of the first pair of ribs and the ribs of the second pair of ribs extends from the front lower suspension connection to the connection interface.

(2) The space frame according to (1), wherein in a side view of the front suspension transition fabrication the first pair of ribs are entirely separated from each other and extend from the front lower suspension connection to the connection interface at an angle, and wherein in the side view of the front suspension transition fabrication the second pair of ribs are entirely separated from each other and extend from the front lower suspension connection to the connection interface at the angle.

(3) The space frame according to (1) or (2), wherein the elongate support members, which are in the form of cylindrical tubes, extend from the second end of the front suspension transition fabrication at a right angle with respect to corresponding connection portions of the connection interface.

(4) The space frame according to any one of (1) to (3), wherein in a bottom view of the space frame, the ribs of the first pair of ribs are aligned with respective ones of the elongate support members of the pair of elongate support members.

(5) The space frame according to any one of (1) to (4), wherein first opposing ribs of the first and second pairs of ribs, on the first and second sides of the body, respectively, are aligned with a first elongate support member of the pair of elongate support members in a side view of the front suspension transition fabrication, and wherein second opposing ribs of the first and second pairs of ribs, on the first and second sides of the body, respectively, are aligned with a second elongate support member of the pair of elongate support members in the side view of the front suspension transition fabrication.

(6) The space frame according to any one of (1) to (5), wherein the body of the front suspension transition fabrication includes three cutouts, a first cutout, a second cutout, and a third cutout between the first and second cutouts in a length direction of the front suspension transition fabrication, wherein the first and second cutouts are identical, and wherein in a bottom view of the space frame, the first, second, and third cutouts are sized and shaped to allow access to respective steering pins of a steering interface.

(7) The space frame according to any one of (1) to (6), wherein the connection interface has an elongate body bent, at an angle, convex outward relative to the front lower suspension connection.

(8) A front suspension fabricated transition comprising: a body having a first end and a second end opposite the first end; a first pair of ribs on a first side of the body; a second pair of ribs on a second side of the body opposite the first side of the body; and a connection interface on the second end of the body, the connection interface being arcuate, wherein the body, the ribs of the first pair of ribs, the ribs of the second pair of ribs, and the connection interface are in the form of plates, wherein the body includes at least a first curved opening and a second curved opening spaced from the first curved opening in a length direction of the body, and wherein the front suspension fabricated transition is asymmetrical in a bottom plan view of the front suspension fabricated transition and in a top plan view of the front suspension fabricated transition.

(9) The front suspension fabricated transition according to (8), further comprising a third opening between the first and second curved openings in the length direction of the body.

(10) The front suspension fabricated transition according to (8) or (9), wherein the ribs of each of the first pair of ribs and the second pair of ribs extend from the first end of the body to the second end of the body, and wherein the ribs extend from the first end of the body at a right angle.

(11) The front suspension fabricated transition according to any one of (8) to (10), wherein in the side view of the front suspension fabricated transition the first pair of ribs are entirely separated from each other and run from the first end of the body to the second end of the body at an angle, and wherein in the side view of the front suspension fabricated transition the second pair of ribs are entirely separated from each other and run from the first end of the body to the second end of the body at an angle.

(12) The front suspension fabricated transition according to any one of (8) to (11), wherein the connection interface has a first connection portion at a first end and a second connection portion at a second end opposite the first end, and wherein the connection interface tapers from thick to thin from each of the first and second connection portions toward a center curved portion of the connection interface.

(13) The front suspension fabricated transition according to any one of (8) to (12), wherein the connection interface is straight from the first end to the center curved portion, and wherein the connection interface is straight from the second end to the center curved portion.

(14) The front suspension fabricated transition according to any one of (8) to (13), wherein each of the ribs of the first and second pairs of ribs has a concave portion at a center portion thereof in a length direction of the rib.

(15) The front suspension fabricated transition according to any one of (8) to (14), wherein the first pair of ribs is welded to the body on the first side of the body, the second pair of ribs is welded to the body on the second side of the body, and the connection interface is welded to the body on the second end of the body.

(16) A method comprising: providing a front suspension transition; and providing one of a front lower suspension or at least one of a first tubular support member or a second tubular support member, each of the first and second tubular supports being cylindrical, wherein the front suspension transition includes: a body having a first end and a second end opposite the first end; a first pair of ribs on a first side of the body; a second pair of ribs on a second side of the body opposite the first side of the body; and a connection interface on the second end of the body, the connection interface being curved, wherein the body includes a first curved opening and a second curved opening spaced from the first curved opening in a length direction of the body, and wherein the front suspension fabricated transition is asymmetrical in a bottom plan view of the front suspension fabricated transition and/or in a top plan view of the front suspension fabricated transition.

(17) The method according to (16), further comprising welding the front suspension transition to said one of the front lower suspension or the at least one of the first tubular support member or the second tubular support member.

(18) The method according to (16) or (17), wherein said providing includes providing both of first tubular support member and the second tubular support member, and wherein said welding includes welding both of the first tubular support member and the second tubular support member to the front suspension transition using an automated welding machine.

(19) The method according to any one of (15) to (18), wherein said providing includes providing the front lower suspension, and wherein said welding includes welding the front suspension transition to the front lower suspension.

(20) The method according to any one of (15) to (19), wherein the front suspension transition is a fabrication consisting of the body, the first pair of ribs, the second pair of ribs, the connection interface, and corresponding weld joints affixing each of the ribs and the connection interface to the body, wherein each of the body, the ribs of the first pair of ribs, the ribs of the second pair of ribs, and the connection interface is in the form of a plate, and wherein the connection interface has a first connection portion at a first end, a second connection portion at a second end opposite the first end, and a center curved portion between the first connection portion and the second connection portion.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A space frame for an off-highway rear haul truck comprising:
  a front lower suspension connection;
  a front suspension transition fabrication; and
  a pair of elongate support members,
  wherein the front suspension transition fabrication is welded to the front lower suspension connection at a first end of the front suspension transition fabrication and is welded to each of the elongate support members at a second end of the front suspension transition fabrication opposite the first end such that the elongate support members are spaced from the front lower suspension connection,
  wherein the front suspension transition fabrication includes:
    a body,
    a first pair of ribs welded on a first side of the body, a second pair of ribs welded on a second side of the body opposite the first side of the body, and a connection interface forming the second end of the front suspension transition fabrication and being welded to each of the elongate support members, the connection interface being arcuate, and wherein each of the ribs of the first pair of ribs and the ribs of the second pair of ribs extends from the front lower suspension connection to the connection interface.

2. The space frame according to claim 1, wherein in a side view of the front suspension transition fabrication the first pair of ribs are entirely separated from each other and extend from the front lower suspension connection to the connection interface at an angle, and wherein in the side view of the front suspension transition fabrication the second pair of ribs are entirely separated from each other and extend from the front lower suspension connection to the connection interface at the angle.

3. The space frame according to claim 1, wherein the elongate support members, which are in the form of cylindrical tubes, extend from the second end of the front suspension transition fabrication at a right angle with respect to corresponding connection portions of the connection interface.

4. The space frame according to claim 1, wherein in a bottom view of the space frame, the ribs of the first pair of ribs are aligned with respective ones of the elongate support members of the pair of elongate support members.

5. The space frame according to claim 1, wherein first opposing ribs of the first and second pairs of ribs, on the first and second sides of the body, respectively, are aligned with a first elongate support member of the pair of elongate support members in a side view of the front suspension transition fabrication, and wherein second opposing ribs of the first and second pairs of ribs, on the first and second sides of the body, respectively, are aligned with a second elongate support member of the pair of elongate support members in the side view of the front suspension transition fabrication.

6. The space frame according to claim 1, wherein the body of the front suspension transition fabrication includes three cutouts, a first cutout, a second cutout, and a third cutout between the first and second cutouts in a length direction of the front suspension transition fabrication, wherein the first and second cutouts are identical, and wherein in a bottom view of the space frame, the first, second, and third cutouts are sized and shaped to allow access to respective steering pins of a steering interface.

7. The space frame according to claim 1, wherein the body, the ribs of the first pair of ribs, the ribs of the second pair of ribs, and the connection interface are in the form of plates, and wherein the connection interface has an elongate body bent, at an angle, convex outward relative to the front lower suspension connection.

8. A front suspension fabricated transition comprising:

a body having a first end and a second end opposite the first end;

a first pair of ribs on a first side of the body;

a second pair of ribs on a second side of the body opposite the first side of the body; and a connection interface on the second end of the body, the connection interface being arcuate, wherein the body, the ribs of the first pair of ribs, the ribs of the second pair of ribs, and the connection interface are in the form of plates, wherein the body includes at least a first curved opening and a second curved opening spaced from the first curved opening in a length direction of the body, and wherein the front suspension fabricated transition is asymmetrical in a bottom plan view of the front suspension fabricated transition and in a top plan view of the front suspension fabricated transition.

9. The front suspension fabricated transition according to claim 8, further comprising a third opening between the first and second curved openings in the length direction of the body.

10. The front suspension fabricated transition according to claim 8, wherein the ribs of each of the first pair of ribs and the second pair of ribs extend from the first end of the body to the second end of the body, and wherein the ribs extend from the first end of the body at a right angle.

11. The front suspension fabricated transition according to claim 8, wherein in the side view of the front suspension fabricated transition the first pair of ribs are entirely separated from each other and run from the first end of the body to the second end of the body at an angle, and wherein in the side view of the front suspension fabricated transition the second pair of ribs are entirely separated from each other and run from the first end of the body to the second end of the body at an angle.

12. The front suspension fabricated transition according to claim 8, wherein the connection interface has a first connection portion at a first end and a second connection portion at a second end opposite the first end, and wherein the connection interface tapers from thick to thin from each of the first and second connection portions toward a center curved portion of the connection interface.

13. The front suspension fabricated transition according to claim 12, wherein the connection interface is straight from the first end to the center curved portion, and wherein the connection interface is straight from the second end to the center curved portion.

14. The front suspension fabricated transition according to claim 8, wherein each of the ribs of the first and second pairs of ribs has a concave portion at a center portion thereof in a length direction of the rib.

15. The front suspension fabricated transition according to claim 8, wherein the first pair of ribs is welded to the body on the first side of the body, the second pair of ribs is welded to the body on the second side of the body, and the connection interface is welded to the body on the second end of the body.

16. A method comprising:

providing a front suspension transition; and providing one of a front lower suspension or at least one of a first tubular support member or a second tubular support member, each of the first and second tubular supports being cylindrical, wherein the front suspension transition includes:

a body having a first end and a second end opposite the first end;

a first pair of ribs on a first side of the body;

a second pair of ribs on a second side of the body opposite the first side of the body; and a connection interface on the second end of the body, the connection interface being curved, wherein the body includes a first curved opening and a second curved opening spaced from the first curved opening in a length direction of the body, and wherein the front suspension fabricated transition is asymmetrical in a bottom plan view of the front suspension fabricated transition and/or in a top plan view of the front suspension fabricated transition.

17. The method according to claim 16, further comprising welding the front suspension transition to said one of the front lower suspension or the at least one of the first tubular support member or the second tubular support member.

18. The method according to claim 17, wherein said providing includes providing both of the first tubular support member and the second tubular support member, and wherein said welding includes welding both of the first tubular support member and the second tubular support member to the front suspension transition using an automated welding machine.

19. The method according to claim 18, wherein said providing includes providing the front lower suspension, and wherein said welding includes welding the front suspension transition to the front lower suspension.

20. The method according to claim 16, wherein the front suspension transition is a fabrication consisting of the body, the first pair of ribs, the second pair of ribs, the connection interface, and corresponding weld joints affixing each of the ribs and the connection interface to the body, wherein each of the body, the ribs of the first pair of ribs, the ribs of the second pair of ribs, and the connection interface is in the form of a plate, and wherein the connection interface has a first connection portion at a first end, a second connection portion at a second end opposite the first end, and a center curved portion between the first connection portion and the second connection portion.

* * * * *